United States Patent
Heller

(10) Patent No.: US 6,827,154 B2
(45) Date of Patent: *Dec. 7, 2004

(54) METHOD AND APPARATUS FOR AUTOMATICALLY CONNECTING A DRIVE MEMBER TO A DRIVEN MEMBER

(76) Inventor: Thomas J. Heller, 16472 - 339$^{th}$ Ave., Seneca, SD (US) 57473

( * ) Notice: Subject to any disclaimer, the term of this patent is extended or adjusted under 35 U.S.C. 154(b) by 0 days.

This patent is subject to a terminal disclaimer.

(21) Appl. No.: 10/444,881

(22) Filed: May 23, 2003

(65) Prior Publication Data

US 2003/0192711 A1 Oct. 16, 2003

Related U.S. Application Data

(63) Continuation of application No. 09/858,624, filed on May 16, 2001, now Pat. No. 6,595,299.
(60) Provisional application No. 60/205,348, filed on May 18, 2000.

(51) Int. Cl.$^7$ .............................................. A01B 59/043
(52) U.S. Cl. ...................................... 172/439; 172/272
(58) Field of Search ......................... 172/47, 249, 272, 172/443, 444, 439, 451, 776; 37/231; 280/416.2; 180/53.3; 403/333, 334, 361

(56) References Cited

U.S. PATENT DOCUMENTS

| | | | |
|---|---|---|---|
| 3,716,253 A | 2/1973 | Gniffke et al. | |
| 4,762,182 A | 8/1988 | Reimann | |
| 4,804,055 A | 2/1989 | Kostamo | |
| 4,887,680 A | * 12/1989 | Nozaka et al. | 180/53.3 |
| 4,944,354 A | 7/1990 | Langen et al. | |
| 5,029,650 A | 7/1991 | Smit | |
| 5,193,623 A | * 3/1993 | Burette | 172/47 |
| 5,538,088 A | 7/1996 | Wait | |
| 5,657,825 A | 8/1997 | Englund | |
| 5,743,339 A | 4/1998 | Alexander, III | |
| 5,950,735 A | 9/1999 | Godbersen | |
| 5,975,216 A | 11/1999 | Gibbons | |
| 6,595,299 B2 | 7/2003 | Heller | |

* cited by examiner

Primary Examiner—Robert E Pezzuto
(74) Attorney, Agent, or Firm—Dorsey & Whitney LLP

(57) ABSTRACT

An apparatus for automatically linking a drive member of a power source and a driven member of an implement, includes two attachment pieces, one attached to the power source, and the other attached to the implement, and an attachment mechanism for automatically connecting the two attachment pieces whereby the drive member and the driven member are operably coupled.

13 Claims, 10 Drawing Sheets

METHOD AND APPARATUS FOR AUTOMATICALLY CONNECTING A DRIVE MEMBER TO A DRIVEN MEMBER

CROSS-REFERENCE TO RELATED APPLICATION(S)

This application is a continuation of U.S. application Ser. No. 09/858,624, filed May 16, 2001 now U.S. Pat. No. 6,595,299 by Thomas Heller, entitled "Method and Apparatus For Automatically Connecting A Drive Member To A Driven Member," hereby incorporated by reference in its entirety, which claims priority to U.S. Provisional Application Ser. No. 60/205,348, filed May 18, 2000.

BACKGROUND OF THE INVENTION

The present invention relates to an apparatus used to automatically couple a drive member of a power source and a driven member of an implement. More particularly, it relates to an apparatus for automatically coupling a power take off of a tractor and a power take off shaft of an implement.

Currently, drive vehicles such as conventional farm tractors, are equipped with a three point hitch system for connecting the tractor to an implement with a two or three point attachment, and a separate draw-bar hitch for connecting the tractor to pull type equipment. Tractors are also equipped with a power take off arrangement, which is used to provide power to an implement to serve a mechanical, operational function. Typically, a tractor's power take off output connects to an implement by way of a power take off shaft carried by the implement.

The connection of hitches on tractors to corresponding connections on farm implements constitutes an onerous task. The tractor operator needs to back the tractor up to the implement, line up the hitches, then dismount from the tractor and position the connection points together and manually insert pins for connection. In addition, the operator needs to couple the power take off from the tractor to the power take off shaft of the implement. Both tasks are time consuming and dangerous.

Alignment of the tractor and the implement can necessitate considerable trial and error positioning of the tractor. This requires the operator to continuously dismount the tractor, check the alignment, get back on the tractor, realign, dismount, etc. The implements and the tractors are extremely heavy machines. Because of this, it is difficult to manually move the attachment points around to line them up. This can cause injury to the operator in one of two ways. First, the strain of lifting and pushing around the attachment points to line them up can cause muscle strains or other injuries commonly associated with heavy lifting. Secondly, there is always the risk of the operator getting a hand or finger accidentally injured between attachment points, or having a section of the tractor or implement move and injure the operator.

Since it is so inefficient to connect and disconnect tractors and implements, operators who need to continuously use two different implements at a certain time, often may use two tractors, one attached to each implement. The operator can then use one implement, dismount the tractor, go to the other tractor, use the second implement, and then go back to the first. This is also burdensome, and requires maintenance of two tractors.

Currently, there do exist methods and devices for automatically coupling tractors to implements. However, these devices do not couple the power take off of the tractor with the power take off shaft of the implement. Current devices either do not allow for the coupling of the power take off and the power take off shaft, or still require that the operator dismount the tractor and connect them by hand.

There is a need for an apparatus for automatically coupling a power take off of a tractor and a power take off shaft of an implement.

BRIEF SUMMARY OF THE INVENTION

In one embodiment, the present invention comprises a coupling device for operably coupling pieces of equipment, particularly wherein one piece of equipment provides an output to a second piece of equipment, and encompasses a method for operably coupling pieces of equipment wherein the coupling is achieved automatically or from a remote location as the pieces of equipment are brought into relative proximity.

It is an important object of the invention to provide an automatic coupler for a drive member and a driven member, so as to provide safety and convenience for the operator of the power source.

Other features and advantages of the coupling apparatus and method of the present invention will become more fully apparent and understood with reference to the following description, and to the appended drawings and claims.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
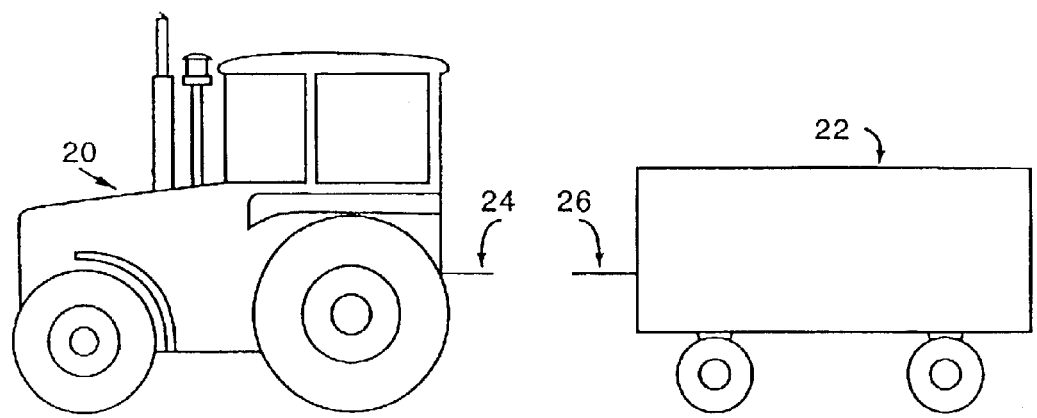
FIG. 1 is a side view of an exemplary vehicle, a tractor, and implement uncoupled.
Figure 2:
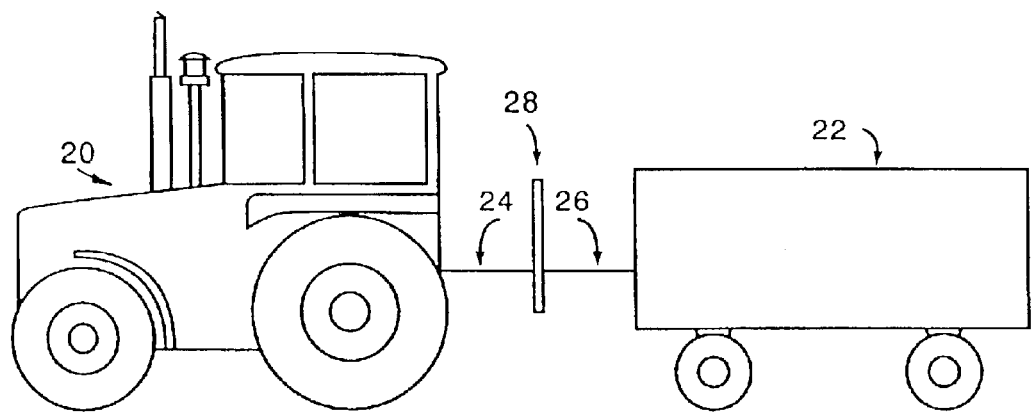
FIG. 2 is a side view of the tractor and implement coupled.

FIG. 1 shows one application of the present invention to automatically couple two pieces of equipment. FIG. 1 depicts a tractor 20 with attachment points 24 and an implement 22 with attachment points 26. FIG. 2 shows the tractor 20 and its attachment points 24 coupled to the implement 22 and its attachment points 26 by an automatic coupler 28 which is the present invention.

The present invention comprises a first attachment piece 30, a second attachment piece 62, and a mechanism for operably coupling the first and second attachment pieces.

Figure 3:
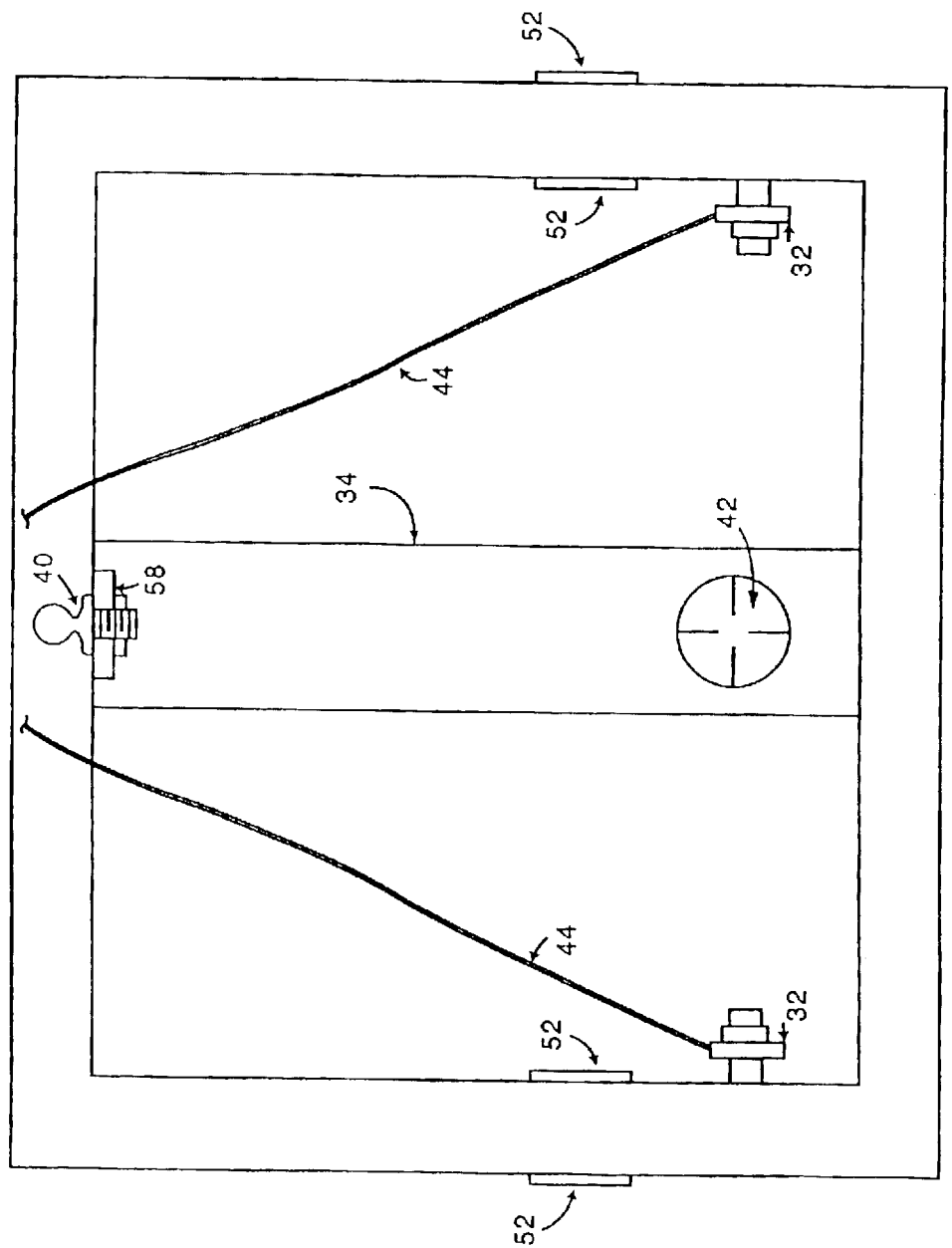
FIG. 3 is a cross sectional view of the tractor carried attachment piece of the present invention.
Figure 4:
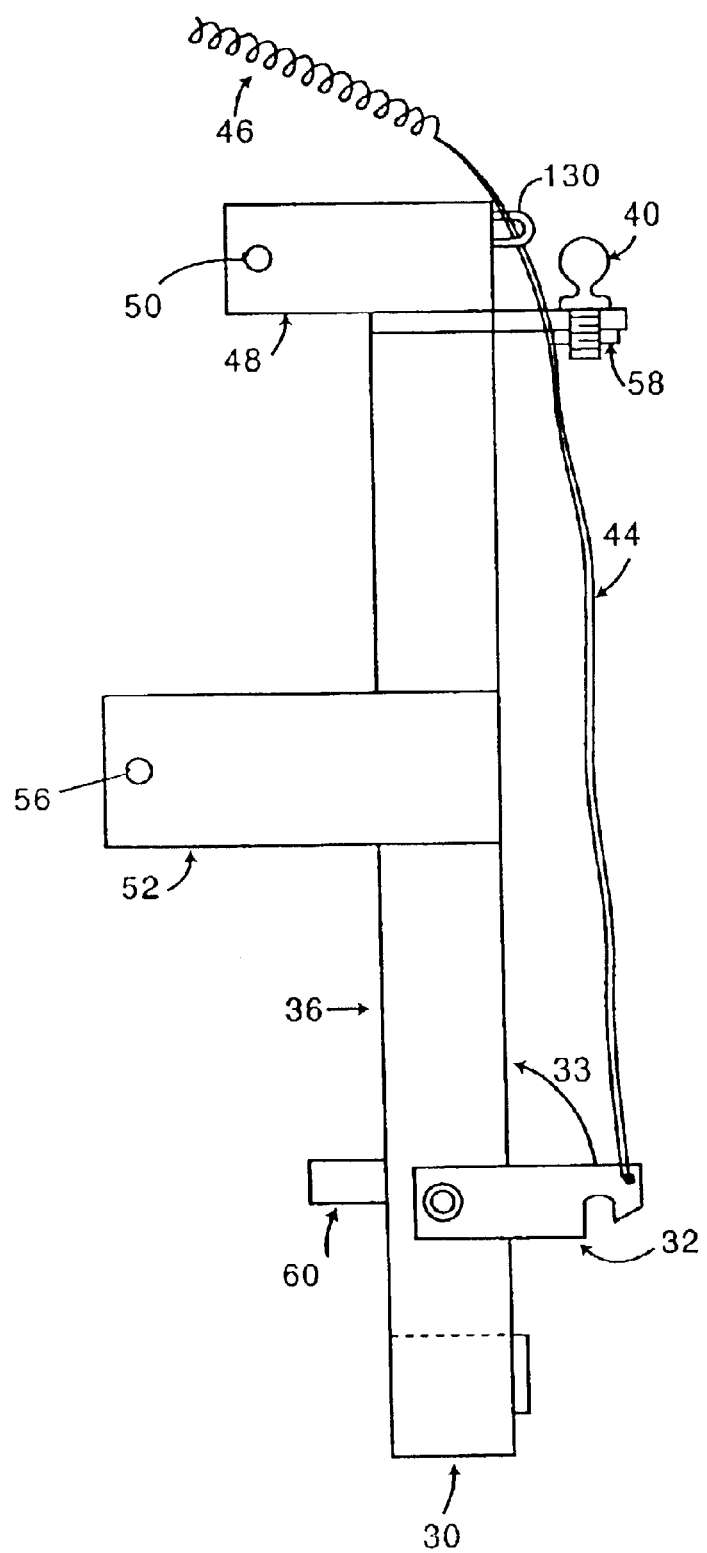
FIG. 4 is a side view of the tractor carried attachment piece of the present invention.

In one embodiment, the attachment pieces have square frames. FIGS. 3 and 4 are a cross-sectional view and a side view of the first attachment piece of this embodiment. In one embodiment, the first attachment piece 30 is a square frame 36 made from square tubing. The frame 36 has a vertical channel 34 bisecting it. One side of the frame 36 has hitch attachment pieces 52, 48 to attach to a three point hitch of a tractor 116, 118 so that when attached, the frame is held in a generally vertical position.

Figure 11:
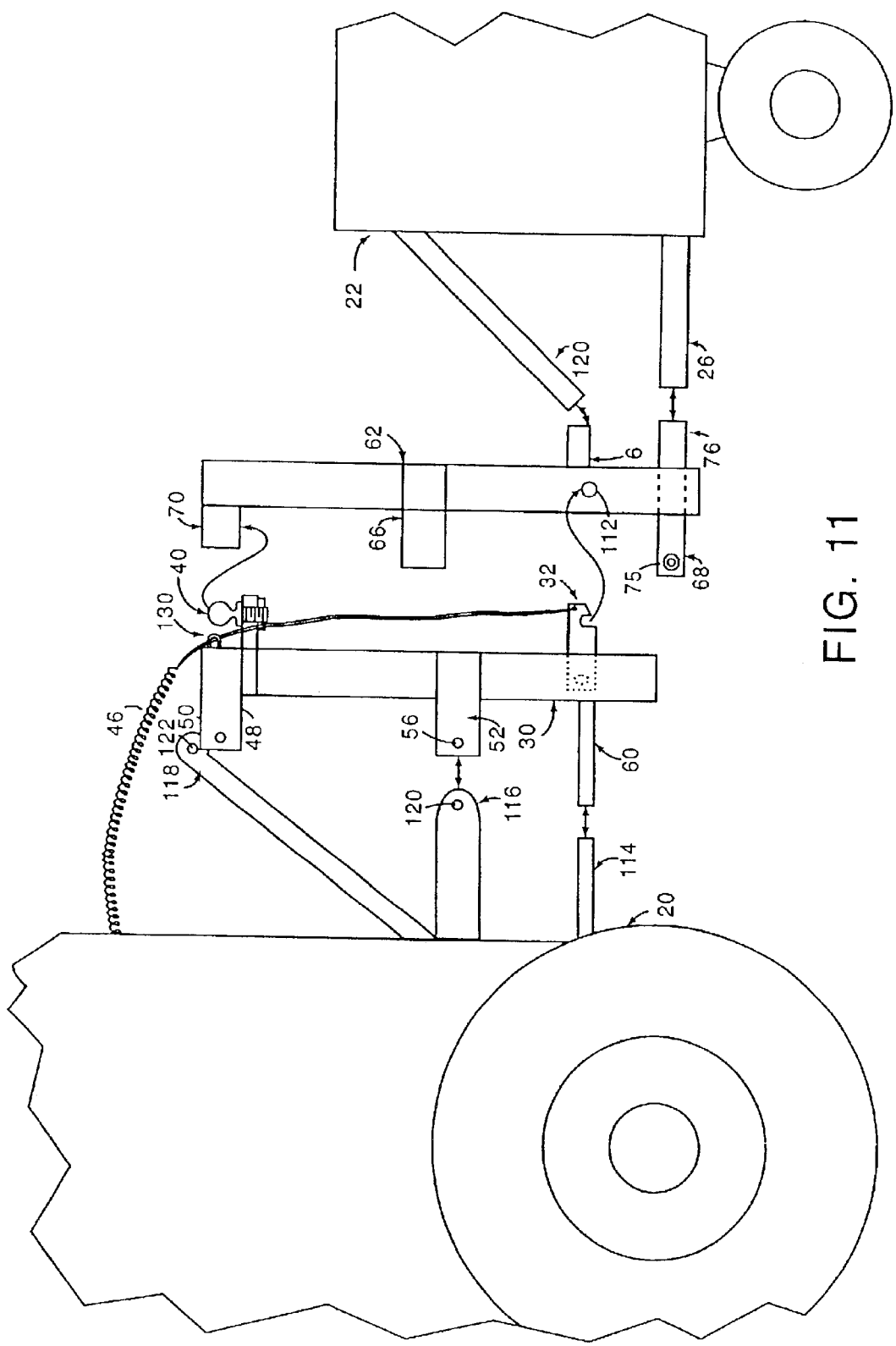
FIG. 11 is a side view of the tractor and the implement attachment pieces connecting.

FIG. 11 shows how the first attachment piece 30 connects to the tractor 20. In one embodiment, the three hitch attachment pieces are attached to the frame of the first attachment piece. Two similarly sized point hitch attachment pieces 52 may be attached to the frame to connect to the point hitches 116 of the tractor 20. In one embodiment, each point hitch attachment piece is two elongated pieces having one lengthwise end attached to the sides of the frame, and the other lengthwise ends protruding towards the tractor 20. One point hitch attachment piece comprises two elongated pieces attached to each side of the square tubing. One set of two is attached to each side of the frame 30, so that they are located approximately in a horizontal plane with each other. Similarly, the point hitches 116 of the tractor 20 are located approximately in a horizontal plane with each other. Preferably, the point hitch attachment pieces 52 are located about halfway down the side of the frame 36. These two point hitch attachment pieces 52 connect to the two point hitches 116 of the tractor 20. The point hitches 116 and the point hitch attachment pieces 52 each have a hole (numerals 120 and 56 respectively). Each point hitch 116 lines up in between each set of two point hitch attachment pieces 52. The hole 120 of the point hitch 116, and the holes 56 of the point hitch attachment pieces 52 line up with each other. A pin or other notable connector is then inserted into the two connection points.

The tractor 20 also has a dead link hitch 118 that attaches to a dead link hitch attachment piece 48 located on the frame 36 of the first attachment piece 30. Preferably, the dead link hitch attachment piece 48 is located on the top member of the frame 36 at approximately the midpoint. The dead link hitch attachment piece 48 may be a rectangular cube with one end of the long members connected to the frame 36, and the other end of the long members of the cube protruding towards the tractor 20. In one embodiment, the length of the dead link hitch attachment piece 48 is about half the length of the point hitch attachment pieces 52. The end of the dead link hitch attachment piece 48 pointing towards the tractor 20 has the middle portion of the end cut away. The two sides of the end of the three point hitch attachment piece 48 on either side of the cut away portion, each have a hole 50. The dead link hitch 118 also has a hole 122 in the connection end. The dead link hitch 118 and the dead link hitch attachment piece 48 are then aligned by lining up the holes. The dead link hitch 118 is then connected to the dead link hitch attachment piece 48 by inserting a pin or other notable connector through the holes 50, 122.

FIG. 3 shows that a drive gear 42 may be carried on the first attachment piece 30 by way of the bisecting channel 34.

Figure 8:
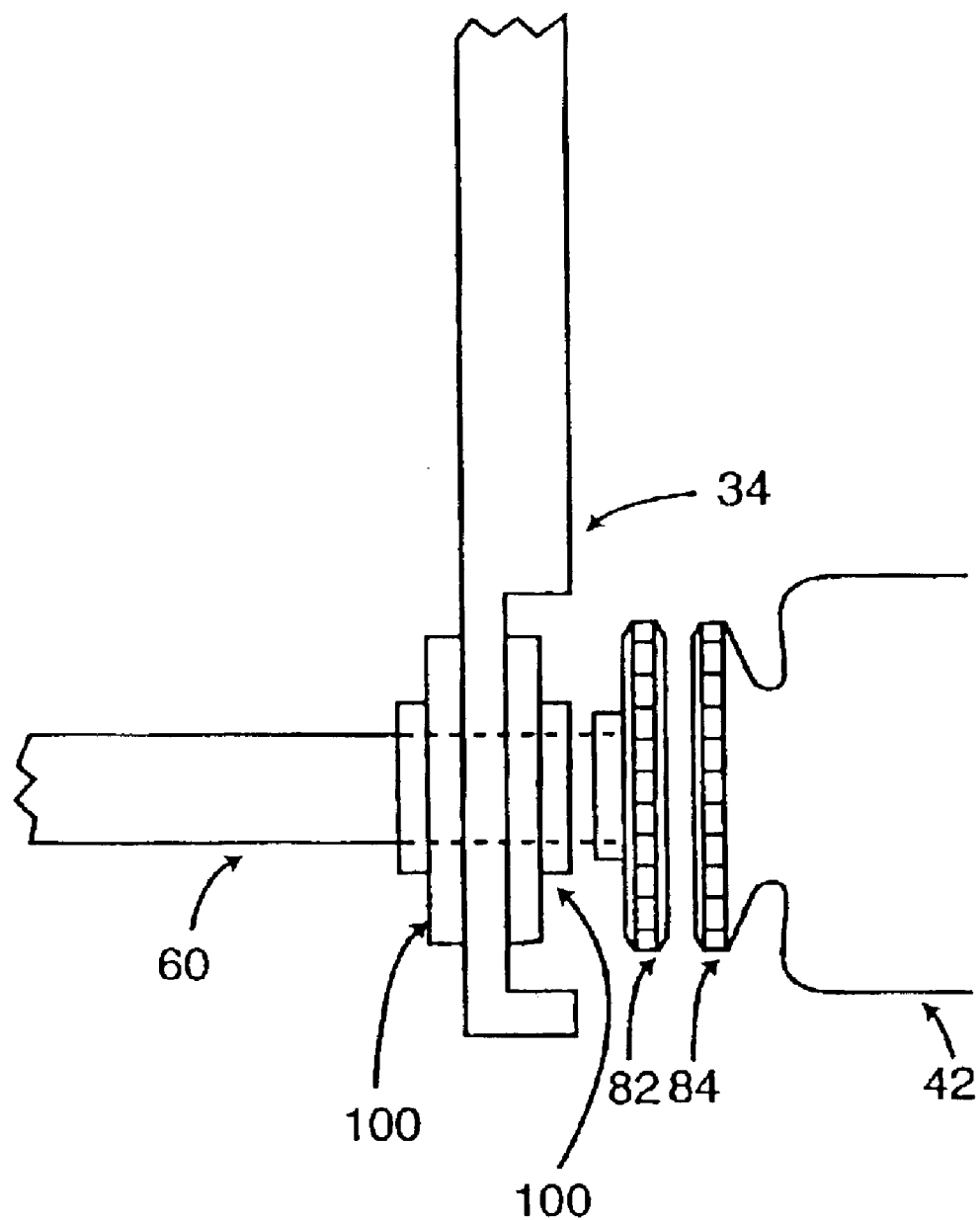
FIG. 8 is a side view of the tractor carried attachment piece of the present invention coupled to the power take off of a tractor.

The channel has a hole in it, through which a drive shaft 60 is inserted, and connected to the first drive gear 42. This is shown in FIG. 8. On each side of the hole, the channel 34 carries a suitable bearing 100 that corresponds to the diameter of the drive shaft 60. The drive shaft 60 has a universal joint on one end that connects to the tractor power take off 114. The other end of the drive shaft 60 is inserted into the hole in the channel, through the bearings 100, and protrudes out of the other end. The end of the drive shaft 60 is then connected to the first drive gear 42.

One skilled in the art will appreciate that the drive shaft 60 and the first drive gear 42 may be connected in many different ways, such as welding, friction fitting, molding, or adhesion. In one embodiment, a high speed sprocket 82 may be attached to the end of the drive shaft 60. The closed end of the first drive gear 42 may also be attached to a high speed sprocket 84. These sprockets may then be connected by an endless double drive chain. One advantage of using this method to connect the drive shaft 60 and the first drive gear 42 is that the sprocket-chain system will absorb some of the torque from the drive shaft, and it has a little give, to allow the first drive gear 42 to line up with the second drive gear 74.

Figure 5:
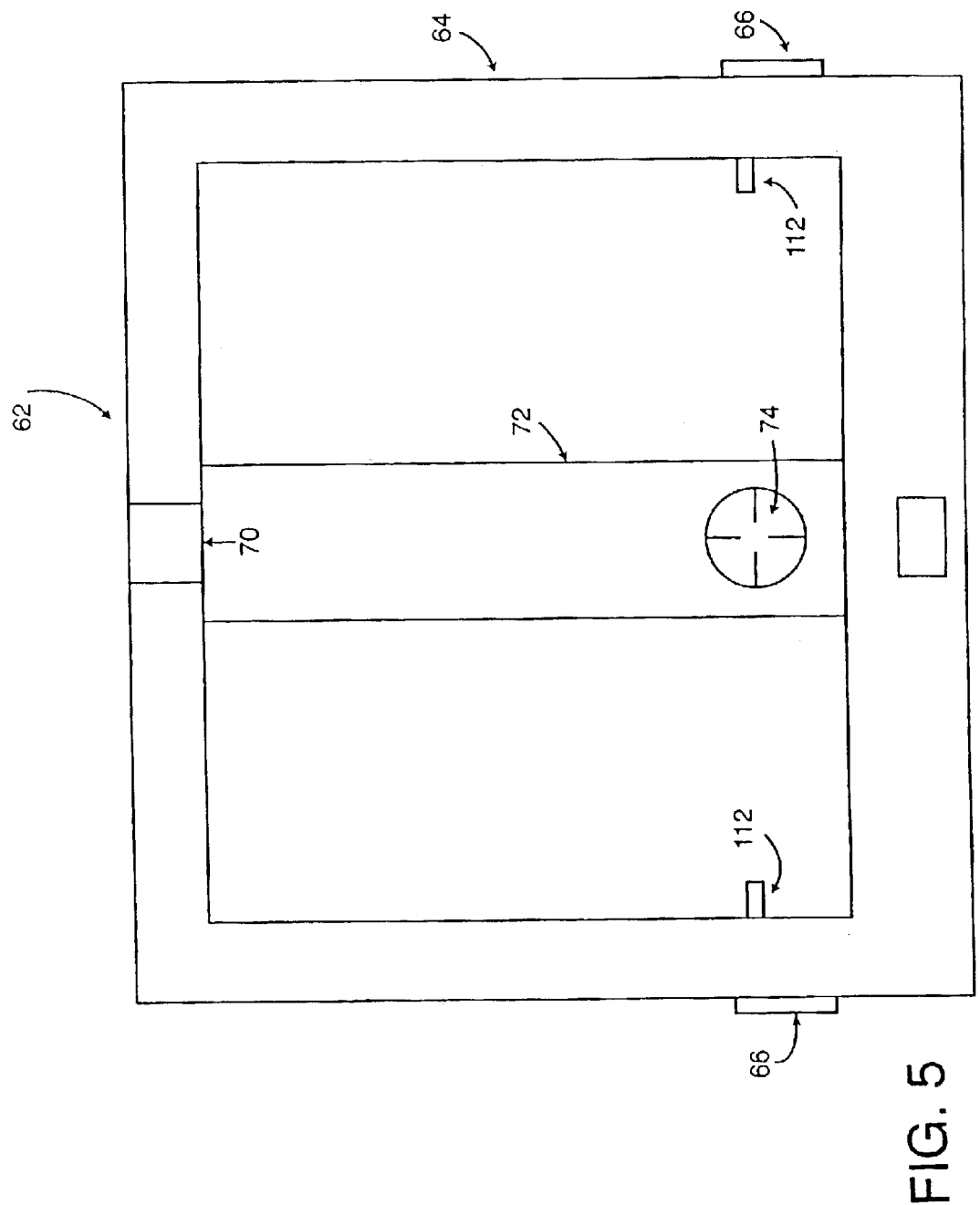
FIG. 5 is a cross sectional view of the implement carried attachment piece of the present invention.
Figure 6:
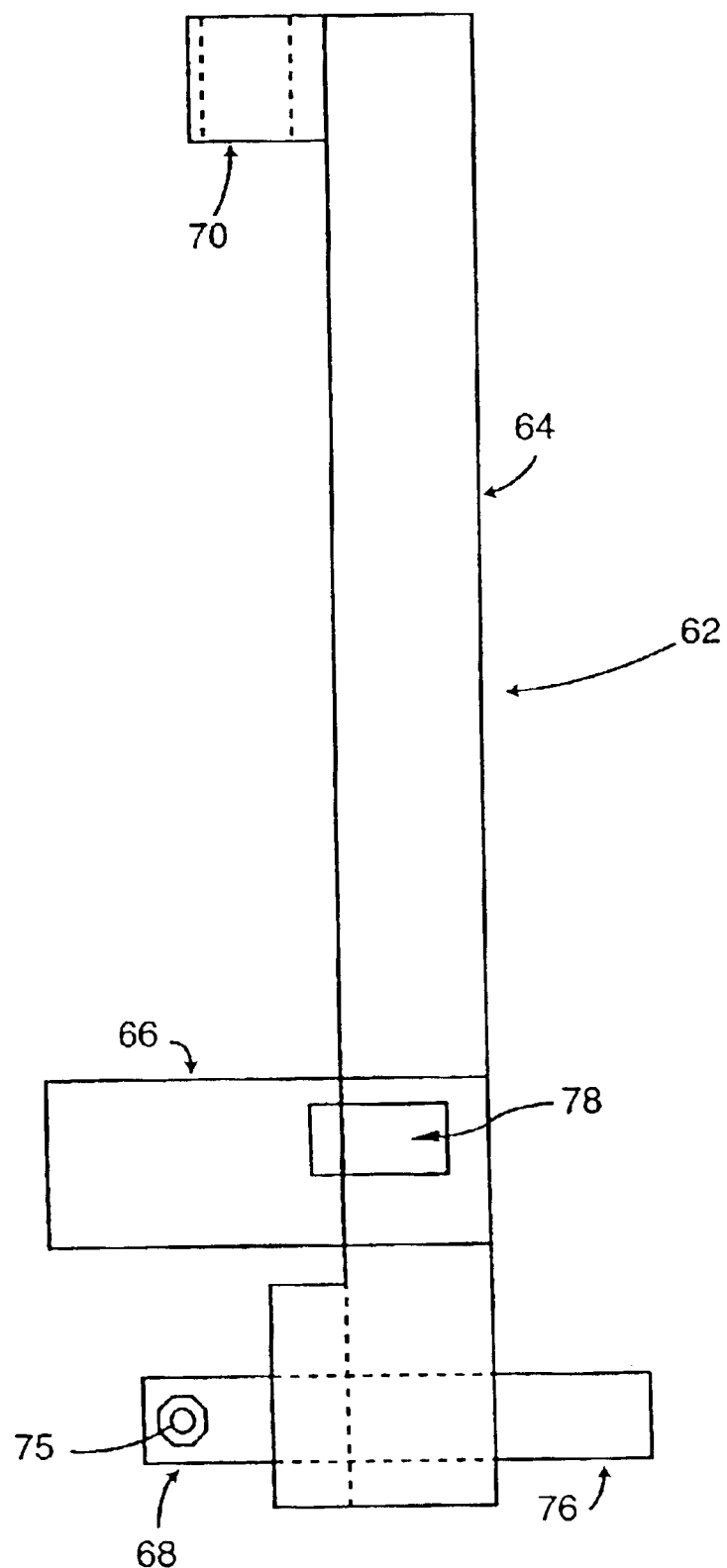
FIG. 6 is a side view of the implement carried attachment piece of the present invention.

FIGS. 5 and 6 show a cross-sectional and a side view of the second attachment piece 62, which compliments the first attachment piece 30. FIG. 11 shows a side view of the second attachment piece 62 connected to the implement 22. In one embodiment, the second attachment piece 62 is a square frame 64 made from square tubing. The frame 64 has a vertical channel 72 bisecting it. One side of the frame 64 has a draw-bar 76 protruding towards an implement 22 in order to attach to a draw-bar of an implement 26, so that when attached, the frame 64 is held in a generally vertical position. The draw-bar 76 is preferably located at approximately the midpoint of the bottom leg of the attachment piece 62. A piece of hollow square tubing 68 is welded into the frame 64 so that it is protruding towards the first attachment piece 30. The hollow piece of square tubing 68 is preferably located at approximately the midpoint of the bottom leg of the attachment piece 62. The hollow piece of square tubing 68 serves two purposes. First, it is the means by which the draw-bar 76 is attached to the second attachment piece 62. The draw-bar 76 is inserted into the hollow square tubing 68, and attached with a bolt 75. Second, the hollow square tubing 68 acts as a guide for the two attachment pieces 30, 62 when in a connected state. The draw-bar 76 has a hole in it that corresponds to a hole in the draw-bar 26 on the implement 22. The attachment piece draw-bar 26 is inserted into the implement draw-bar 76 so that the holes in each line up. A pin, or other notable connector, is then inserted to hold the implement 22 and the second attachment piece 62 in a connected state.

Figure 7:
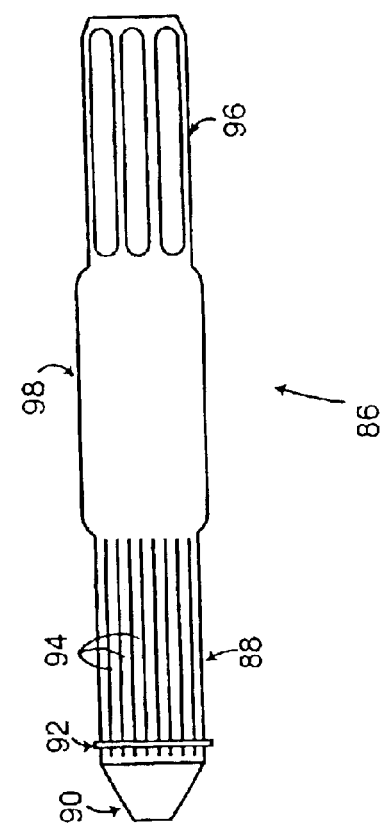
FIG. 7 is the shaft and gear coupling apparatus of the present invention.
Figure 7:
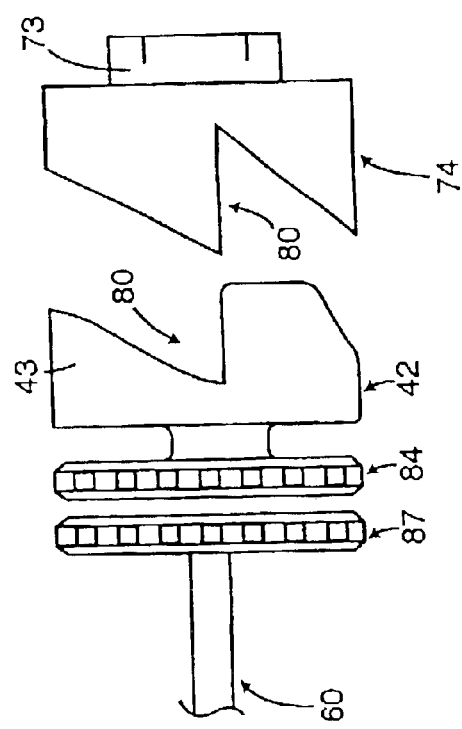

The implement 22 has a power take off shaft 120 which may be coupled to the second attachment piece 62. One end of the power take off shaft 120 is attached to the implement 22, and the other end has a universal joint that connects to the connector shaft 86. FIG. 7 shows the connector shaft 86. In one embodiment, the connector shaft 86 has two ends. One end has a power take off spline 96 generally similar to the power take off 114 of the tractor 20. This end of the connector shaft connects to the power take off shaft 120 of the implement 22.

Figure 9:
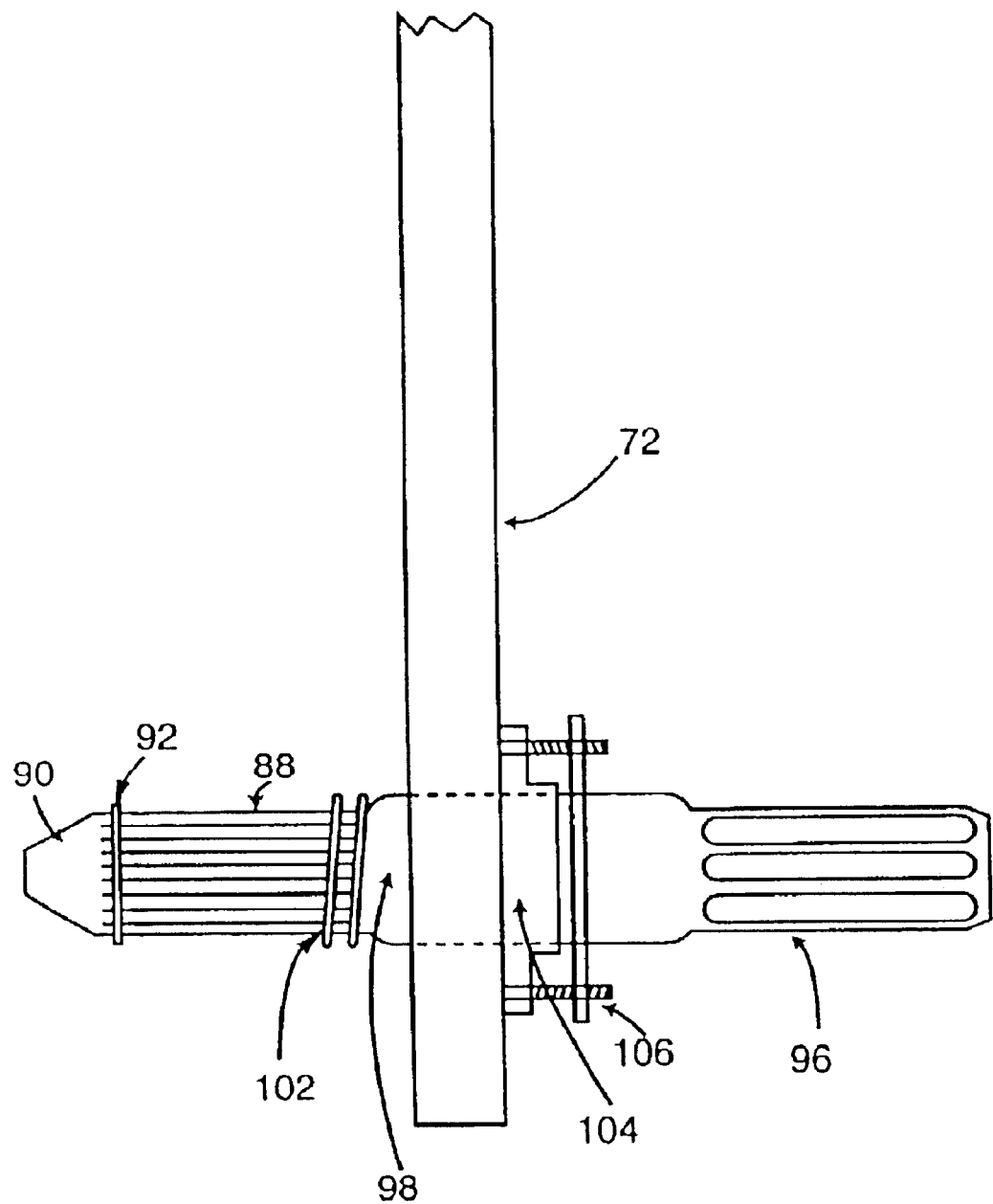
FIG. 9 is a side view of the implement carried attachment piece carrying the shaft coupler of the present invention.

FIG. 7 shows the connector shaft 86. The connector shaft 86 has a first end 96 and a second end 88. The first end 96 is designed with power take off spline similar to the power take off 114 of a tractor 20. The second end 88 is a splined shaft designed to carry a second drive gear 74 and insert into the first drive gear 42 attached to the drive shaft 60, so that the two drive gears can lock together. The end 90 of the splined shaft 88 is tapered in order to insert easily into the first drive gear 42. The splined shaft end 88 of the connector shaft 86 also has a snap on ring 92 at the edge of the untapered part of the shaft in order to keep the second drive gear 74 from falling off of the splined shaft 88. AS shown in FIG. 9, the splined shaft 88 carries a spring 102 which pushes the second drive gear 74 into a locking connection with the first drive gear 42 carried on the drive shaft 60. The splines 94 of the splined end of the shaft 88, are designed to fit with the splines 108 inside of the drive gears 42, 74. The middle section 98 of the connector shaft 86 is attached to the second attachment piece 62.

In one embodiment, the connector shaft 86 is attached to the second attachment piece 62. FIG. 9 shows a side view of how the connector shaft 86 is attached to the second attachment piece 62. The channel 72 bisecting the frame 64 of the second attachment piece 62 has a hole in it. A suitable bearing 104 is attached to the side of the channel 72 facing the implement 22 over the hole. This bearing is the same diameter as the middle section 98 of the connector shaft 86. The bearing 104 may be held in place with a bolt on collar 106 to keep the bearing 104 from moving. The connector shaft 86 is attached to the channel 72 of the second attachment piece 62 by the bearing 104. The bearing 104 is attached to the connector shaft 86 at approximately the midpoint of the shaft, so that the splined end of the shaft 88 is protruding towards the first attachment piece 30, and the power take off end 96 is protruding towards the implement 22.

In one embodiment, the first and second attachment pieces 30, 62 connect together so as to connect the tractor 20 and the implement 22, as well as to couple the power take off 114 and the power take off shaft 120. FIGS. 3 and 4 show a cross-sectional and side view of the first attachment piece 30. A trailer ball hitch 40 is attached to the frame 36. The trailer ball hitch 40 is located near the midpoint of the top horizontal section of the square frame 36. The trailer ball hitch 40 comprises a ball connected to a connection piece 58 which connects to the frame 36. Preferably, the connection piece 58 is attached to the underside of the top horizontal member of the square frame 36. The trailer ball hitch is attached, so the trailer ball is located on the side of the first attachment piece facing away from the tractor 20.

A latching system 32 may also be attached to the first attachment piece 30. In one embodiment, the latching system comprises hooks and pegs, the hooks 32 being located on the first attachment piece 30, and the pegs 112 being located on the second attachment piece 62. In one embodiment, the hooks 32 are rectangular pieces with a section cut out at one end that will fit over a peg 112 located on the second attachment piece 62. There are preferably two hooks 32, one on each side of the first attachment piece 30. Each hook 32 may be attached to the inside of the vertical members of the square frame 36. Both hooks are located on a generally horizontal plane, and are preferably near the bottom of the vertical members of the frame 36. Each hook 32 may have one end attached to the frame 36 with the hook end protruding towards the second attachment piece 62. The hooks 32 may be connected to the frame 36 in such a way that they are allowed to pivot from a position parallel to a generally horizontal axis to a position perpendicular to a generally horizontal axis, as indicated by arrow 33 in FIG. 4.

In one embodiment, an elongated operating member 44, for example, a rope is attached to the free end of each hook 32. One skilled in the art will appreciate that any elongated member may be used, such as a cable, bungee cord, or a wire. A connecter, such as a spring 46, connects the rope 44 to the tractor 20. The elongated operating member 44 may be one rope with each end attached to a hook 32, and the spring 46 connected to the midpoint of the rope, or it can be two ropes, each rope with one end attached to the free end of a hook 32, and the other end of each rope attached to the spring 46. This rope and spring system serves to raise and lower the free ends of the hooks 32. The three point hitch of a tractor can be raised and lowered by the operator from the seat of the tractor 20, using hydraulics. Thus, when the first attachment piece 30 is attached to the three point hitch of the tractor, the first attachment piece 30 can be raised and lowered as well. The spring 46 is connected to a static part of the back of the tractor 20, so that when the three point hitch raises the attachment piece 30, the ropes 44 have slack, and the hooks 32 are parallel with a generally horizontal axis. Conversely, when the three point hitch of the tractor 20 is lowered, the ropes 44 get taught, and raise the hooks 32. There may optionally be a guiding piece 130 located on the second side of the first attachment piece 30 at the top horizontal member. In the preferred embodiment, the guiding piece 130 is a metal circle, welded to the frame 30. The guiding piece 130 should be shorter in length than the flat metal piece 58 that holds the trailer ball hitch 40. The guiding piece 130 serves two purposes. First, it restricts the elongated operating member 44 from moving transversely along the top horizontal member of the attachment piece 30. Second, it holds the elongated member 44 in a generally more parallel state relative to the attachment pieces 30, 62.

Figure 10:
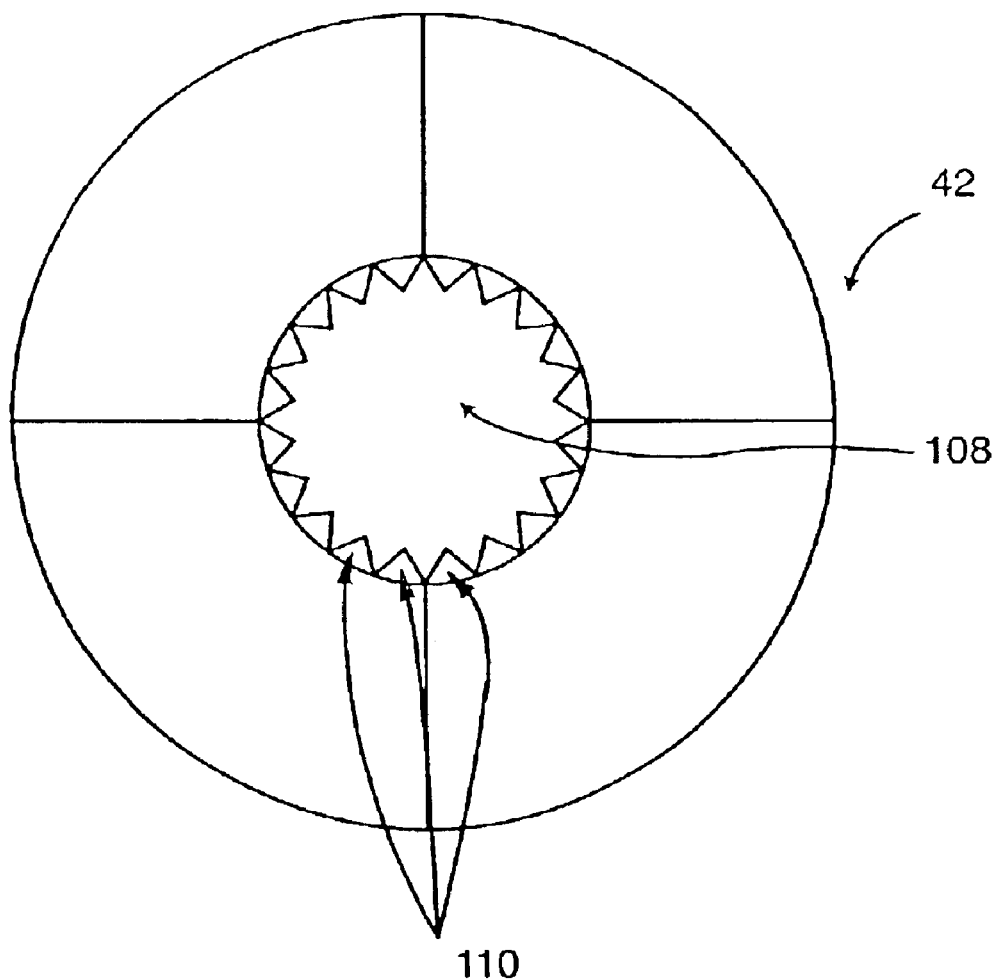
FIG. 10 is a cross sectional view of the drive gear of the present invention.

In one embodiment, the first attachment piece may have a first drive gear 42 attached to the end of the drive shaft 60 on the side of the first attachment piece facing the second attachment piece. The first drive gear 42 has an open end and a closed end. A cross-section of the open end is shown in FIG. 10. The open end, has an aperture 108 in which to receive the splined shaft 88. The inside of the first drive gear 42 has splines 110 around the circumference of the hole 108 that compliment and fit with the splines 94 of the splined shaft 88. The first drive gear 42 has a housing 43. This housing 43 is beveled 80, in order to lock with the second drive gear 74 located on the splined shaft 88 which also has a housing 73 which is oppositely beveled 80.

In one embodiment, the second attachment piece 62 may have complementary parts to connect with all of the pieces of the first attachment piece 30. A receiving piece 70 may be located near the midpoint of the top horizontal member of the square frame 64. The receiving piece 70 is located on the side of the second attachment piece 62 facing the first attachment piece 30. The receiving piece 70 is used to receive the ball hitch 40. The receiving piece 70 may be enclosed on the top, and open on the bottom. Its diameter is complementary to the diameter of the ball hitch 40. The ball hitch 40 and the receiving piece 70 are located in complementary positions, so that when the two attachment pieces 30, 62 are brought together, they are coupled. One skilled in the art will readily recognize that the ball hitch 40 can be attached to the second attachment piece 62, and the receiving piece 70 may be attached to the first attachment piece 30. The ball hitch 40 may also be attached so as to be upside down, and the receiving piece 70 may be open on the top and closed on the bottom, so as to receive the ball in an opposite manner than described in the above embodiment. However they are used, the ball hitch 40 and the receiving piece 70 should be complimentary to each other.

In one embodiment, pegs 112 may be located on the second attachment piece 62 in order to receive the hooks 32 located on the first attachment piece 30. In one embodiment, the pegs 112 are located near the bottom of the vertical members of the square frame 64 on the inside of the frame. The pegs 112 are in a generally horizontal plane with each other. In one embodiment, the pegs may be situated so that one end of the peg is attached to the inside of the vertical member of the frame 64, and the other end is pointing to the other vertical member of the frame. The pegs 112 are situated so that they receive the hooks 32 when the two attachment pieces are brought together. The location of the pegs 112 and hooks 32 can be varied, and any number can be used, but wherever the pegs 112 and the hooks 32 are located, they should be complementary to each other.

The splined shaft end 88 of the connector shaft 86 is positioned so that when the two attachment pieces are brought together, the splined shaft 88 is inserted into the open end of the first drive gear 42 located on the first attachment piece 30, tapered end 90 first. When the splined shaft 88 is inserted into the first drive gear 42 on the first attachment piece 30, the second drive gear 74, carried on the splined shaft 88 locks in connection with the first drive gear 42. The housings on each drive gear are oppositely beveled 80 in order to lock into connection with each other. The spring 102 on the splined shaft 88 allows the second drive gear 74 to move a little in order to fit into a locking position with the first drive gear 42.

In one embodiment of the invention, the second attachment piece 62 may have guides 66, carried on the outside of the frame 64. Preferably, there is a guide on each vertical member of the square frame 64. The guides 66 can be flat plates with one end attached to the square frame 64, and the other end protruding towards the first attachment piece 30. The guides 66 can be located on either attachment piece. The function of the guides 66 is to prevent the two attachment pieces from moving transversely relative to one another when in a connected state.

In one embodiment of the invention, the second attachment piece 62 frame 64 has longer vertical members than the first attachment piece 30. The top horizontal portions of each attachment piece align, with the bottom horizontal portions being out of alignment. In this embodiment, there is a guide 68 comprised of square tubing attached at approximately the midpoint of the bottom horizontal member of the square frame 64, protruding towards the first attachment piece 30. When the first and second attachment pieces are brought together, the guide 68 slips under the bottom horizontal member of the square frame 36 of the first attachment piece 30. This guide prevents the connected pieces from traversing vertically relative to one another.

To use one embodiment of the invention, the first attachment piece 30 is attached to the tractor 20 as explained above and shown in FIG. 11. The second attachment piece 62 is then attached to the implement 22 as explained above and shown in FIG. 11. The spring 46 and rope 44 arrangement is set so that when the two attachment pieces are at the same level, the hooks 32 are at their lowest level, and thus received by the pegs 112. The three point hitch on the tractor is lowered so that the ropes 44 raise the hooks 32.

When the three point hitch is lowered, the first attachment piece 30 also lowers. This lowering is not in a straight vertical line. As the three point hitch lowers, the dead point hitch 118 pushes the top portion of the first attachment piece 30 away from the tractor 20. In an opposing response, the bottom portion of the first attachment piece 30 is drawn in towards the tractor 20. The second attachment piece 62 is a little top heavy since it is connected at the bottom, so the top tends to sag down, and the first attachment piece 30 is held in that angled position by the three point hitch.

The tractor 20 is backed up towards the implement 22 until the ball hitch 40 is approximately under the receiving piece 70 to receive the hitch. At this point, the two attachment pieces form an upside down V. Then, the operator, from his seat, hydraulically lifts the three point hitch and the first attachment piece 30. When the three point hitch is raised, the dead point hitch 118 pulls the top portion of the first attachment piece 30 back towards the tractor 20. The bottom portion of the first attachment piece is opposingly pushed away from the tractor 20. At a point where the two attachment pieces 30, 62 are in alignment, the two attachment pieces should both be generally parallel to one another. As this occurs, the ball hitch 40 is received by the receiving piece 70, and pulls the two attachment pieces together. As this happens, the hooks 32 lower to be received by the pegs 112, and the splined shaft 88 is inserted into the first drive gear 42. The first drive gear 42 and the second drive gear 74 enter into a locked connection, and the first 30 and second 62 attachment pieces are connected. When the operator switches on the power take off 114, the drive shaft 60 turns, which is attached to the first drive gear 42. The first drive gear 42 drives both the splined shaft 88 and the second drive gear 74 carried by the splined shaft 88. The splined shaft 88 is part of the connector shaft 86, so the power take off end 96 of the connecter shaft 86 also turns. The power take off end 96 of the connecter shaft 86 is attached to the power take off shaft 120 of the implement 22. The power take off shaft 120 is driven, and performs whatever operation the implement is used for.

To disconnect the apparatus, the operator lowers the three point hitch. As the three point hitch lowers, the ropes 44 get taught, and raise the hooks 32, thus disengaging them from the pegs 112. As the bottom of the first attachment piece is drawn in towards the tractor 20, the splined shaft 88 is retracted from the drive gear 42. When the three point hitch lowers enough, the ball hitch 40 comes out of the receiving piece 70. The operator may then drive the tractor 20 away, free from the implement.

Since the three point hitch can be raised and lowered from the operator's seat on the tractor, there is no need for the operator to dismount the tractor and make any alignments or connections. The only manual work needed is the initial attachment of the first attachment piece to the tractor, and the second attachment piece to the implement. If all of the implements have a second attachment piece on them, and the tractor has a first attachment piece attached to it, there is never any more need for the operator to manually attach the tractor to the implement, or couple the power take off to the power take off shaft.

The accompanying Figures and this description depict and describe embodiments of the coupling system and method of the present invention, and features and components thereof. Fastening, mounting, attaching or connecting the components of the present invention to form the apparatus or device as a whole, unless specifically described otherwise, are intended to encompass conventional fasteners such as machine screws, nut and bolt connectors, machine threaded connectors, snap rings, clamps such as screw clamps and the like, rivets, nuts and bolts, toggles, pins and the like. Components may also be connected by welding, friction fitting or deformation, if appropriate. Electrical connections, if any, may be made using appropriate electrical components and connection methods, including conventional components and connectors. Unless specifically otherwise disclosed or taught, materials for making components of the present invention are selected from appropriate materials such as metal, metallic alloys, fibers, plastics and the like, and appropriate manufacturing or production methods including casting, extruding, molding and machining may be used.

Any references herein to front and back, right and left, top and bottom, upper and lower and horizontal and vertical are intended for convenience of description only, not to limit the present invention or its components to any one positional or spatial orientation. Such terms are to be read and understood with their conventional meanings. In the Figures, elements common to the embodiments of the invention are commonly identified.

It is contemplated that various changes may be made without deviating from the spirit and scope of the present invention. Accordingly, it is intended that the scope of the present invention not be limited strictly to that of the above description of the present invention.

Although the present invention has been described with reference to preferred embodiments, persons skilled in the art will recognize that changes may be made in form and detail without departing from the spirit and scope of the invention.

What is claimed is:

1. An apparatus for automatically coupling a power takeoff drive of an automotive machine to a power takeoff shaft of an implement comprising:
   (a) a first attachment element configured to be removeably attachable to the automotive machine, the first attachment element having a first coupling element configured to be operably connectable to the power takeoff drive; and
   (b) a second attachment element configured to be removeably attachable to the implement; the second attachment element having a second coupling element configured to be operably connectable to the power takeoff shaft, wherein the first coupling element and the second coupling element are configured to be automatically coupleable regardless of any rotational disposition of the first or second coupling elements.

2. The apparatus of claim 1 wherein the automotive machine is a tractor.

3. The apparatus of claim 2 wherein the tractor is a lawn tractor.

4. The apparatus of claim 1 wherein the automotive machine is a skid-steer loader.

5. The apparatus of claim 1 wherein the automotive machine is a track loader.

6. The apparatus of claim 1 wherein the automotive machine is an all-terrain vehicle.

7. An apparatus for automatically coupling a drive member of a power source to a driven member of an implement comprising:
   (a) a first coupling element comprising
      (i) a first side having a drive member connection element; and
      (ii) a second side defining a first insertion hole; and
   (b) a second coupling element configured to be automatically coupleable with the first coupling element, the second coupling element comprising
      (i) a housing defining a second insertion hole; and
      (ii) a shaft configured to be connectably inserted through the second insertion hole, the shaft having a first end compatible with the first insertion hole.

8. The apparatus of claim 7 wherein the second side of the first coupling element is coupleable with the housing of the second coupling element when the first coupling element and second coupling element are contacted.

9. The apparatus of claim 8 wherein the second side of the first coupling element is beveled and the housing of the second coupling element is complementarily beveled.

10. The apparatus of claim 7 wherein the shaft is a connector shaft.

11. The apparatus of claim 7 wherein the shaft is a power takeoff shaft.

12. A method for automatically coupling a power takeoff drive of an automotive machine to a power takeoff shaft of an implement, the method comprising:
    attaching a first attachment element having a first coupling element to the automotive machine, whereby the first coupling element is operably connected to the power takeoff drive;
    attaching a second attachment element having a second coupling element to the implement, whereby the second coupling element is operably connected to the power takeoff shaft; and
    contacting the first and second coupling elements, wherein the first and second coupling elements automatically couple regardless of any rotational disposition of the first or second coupling elements.

13. The apparatus of claim 1, wherein the first coupling element is a splined coupling element configured to be connectable to the power takeoff drive.

* * * * *